United States Patent [19]

Udagawa

[11] Patent Number: 5,213,345
[45] Date of Patent: May 25, 1993

[54] STEEL LAMINATE GASKET WITH WIDE SEALING AREA

[75] Inventor: Tsunekazu Udagawa, Ichikawa, Japan

[73] Assignee: Ishikawa Gasket Co., Ltd., Tokyo, Japan

[21] Appl. No.: 692,389

[22] Filed: Apr. 30, 1991

Related U.S. Application Data

[63] Continuation-in-part of Ser. No. 193,215, May 11, 1988, Pat. No. 5,054,795, which is a continuation of Ser. No. 928,937, Nov. 10, 1986, abandoned.

[51] Int. Cl.$^5$ .............................................. F16J 15/08
[52] U.S. Cl. .................. 277/235 B; 277/180; 277/234; 277/236
[58] Field of Search ............... 277/235 B, 180, 234, 277/236

[56] References Cited

U.S. PATENT DOCUMENTS

| | | | |
|---|---|---|---|
| 4,799,695 | 1/1989 | Yoshino | 277/235 B X |
| 4,834,399 | 5/1989 | Udagawa et al. | 277/235 B |
| 4,867,462 | 9/1989 | Udagawa | 277/235 B |
| 4,896,891 | 1/1990 | Udagawa | 277/235 B |
| 4,938,488 | 7/1990 | Udagawa et al. | 277/235 B |
| 4,971,338 | 11/1990 | Udagawa et al. | 277/235 B |
| 5,054,795 | 10/1991 | Udagawa et al. | 277/235 B X |

FOREIGN PATENT DOCUMENTS

| | | | |
|---|---|---|---|
| 810728 | 3/1937 | France | 277/235 B |
| 2636397 | 3/1990 | France | |
| 211660 | 8/1989 | Japan | 277/235 B |
| 954327 | 4/1964 | United Kingdom | 277/235 B |
| 2222639 | 3/1990 | United Kingdom | 277/235 B |

Primary Examiner—William A. Cuchlinski, Jr.
Assistant Examiner—James K. Folker
Attorney, Agent, or Firm—Kanesaka and Takeuchi

[57] ABSTRACT

A steel laminate gasket of the invention is installed in an internal combustion engine having at least one hole therein. The gasket comprises a first metal plate, and a second metal plate situated under the first metal plate. The first plate includes a sealing device around a first hole to be sealed, and a wide bead situated between the sealing device and a base portion of the first plate. The second plate has a second hole larger than the sealing device, and a support bead around the second hole. When the first and second plates are assembled, the second plate does not pile the sealing device, while the support bead is located under the wide bead. When the gasket is tightened, the sealing device seals around the hole, and also, the support bead supports the wide bead to widely seal around the hole.

8 Claims, 1 Drawing Sheet

STEEL LAMINATE GASKET WITH WIDE SEALING AREA

CROSS-REFERENCE TO RELATED APPLICATION

This is a continuation in part of application Ser. No. 193,215, filed on May 11, 1988, now U.S. Pat. No. 5,054,795, issued Oct. 8, 1991, which, in turn, is a continuation application Ser. No. 928,937 filed on Nov. 10, 1986, abandoned.

BACKGROUND OF THE INVENTION AND RELATED ART STATEMENT

The present invention relates to a steel laminate gasket of a very thin type.

A conventional steel laminate gasket is constructed by laminating several plates, and is provided with a complicated sealing portion around a hole to be sealed. Consequently, it is difficult to manufacture a steel laminate gasket with light weight. Also, productivity of a steel laminate gasket is poor. As a result, a steel laminate gasket is expensive than other gaskets.

In a small engine, a gasket must be light in weight and manufactured at a low cost. However, a conventional steel laminate gasket is heavy and expensive. Therefore, a conventional steel laminate gasket is not usually used for a small size engine.

In U.S. Pat. No. 4,834,399, a gasket formed of two plates has been proposed, wherein an area around a hole is sealed by one or two sealing means formed on the plates. The gasket can securely seal around the hole as intended. However, the gasket is not suitable for sealing around a hole where a large force is applied, e.g. an engine with high compression ratio.

In U.S. Pat. Nos. 4,896,891 and 4,971,338, a gasket is formed of at least two plates, wherein a small bead formed on a lower plate is situated under a large bead formed on an upper plate to support the large bead. The gaskets as disclosed in the patents can provide relatively wide sealing area, but the gaskets are not so good where tightening pressure is not so highly applied near the hole to be sealed.

Accordingly, one object of the present invention is to provide a steel laminate gasket with wide sealing area suitable for securely sealing around a hole, to which tightening pressure is not so highly applied.

Another object of the invention is to provide a steel laminate gasket as stated above, which is light in weight and simple in structure.

A further object of the invention is to provide a steel laminate gasket as stated above, which can securely seal around a hole without concentrating sealing pressure at one portion.

A still further object of the invention is to provide a steel laminate gasket as stated above, which can be easily and economically manufactured.

Further objects and advantages of the invention will be apparent from the following description of the invention.

SUMMARY OF THE INVENTION

A steel laminate gasket of the invention is designed to be installed in an internal combustion engine having at least one hole therein. The gasket comprises a first metal plate and a second metal plate situated under the first metal plate.

The first plate includes at least one first hole corresponding to the hole of the engine, and a sealing device formed around the first hole to define and seal around the same. Further, the first plate includes a base section extending substantially throughout the entire area of the gasket, and a wide bead situated between the sealing device and the base section. The wide bead includes width greater than height thereof. Therefore, when the gasket is tightened, the wide bead is compressed to widely seal around the first hole outside the sealing device.

The second plate includes at least one second hole, and a support bead formed around the second hole. The diameter of the second hole is larger than the diameter of the sealing device to permit the second plate to pile over the base section without laying over the sealing device. When the first and second plates are assembled, the support bead is located under the wide bead of the first metal plate.

In the gasket of the invention, the sealing device and the wide bead formed on the first plate are radially spaced apart from each other relative to the hole of the engine, while the support bead is located under the wide bead. Therefore, when the gasket is tightened, surface pressure is not concentrated at one portion and can seal widely and securely around the hole.

In particular, when the gasket is tightened, the sealing device is not so compressed, but the wide bead is compressed while the support bead supports the wide bead. Therefore, the wide bead and the support bead basically resiliently seal around the hole of the engine.

The sealing device is formed of a lower section, an upper section and a curved portion situated between the upper and lower sections. The lower section is connected to or extends to the wide bead, and the upper section is turned at the curved portion to be located above the lower section. The curved portion defines the first hole.

The thickness of the first plate may be thicker than that of the second plate, which means that the sealing device is thicker than the total thickness of the gasket outside the sealing device. Consequently, creep relaxation of the wide bead and the support bead is prevented when the gasket is tightened.

The upper section may entirely abut against the lower section to form a solid portion thereat. As a result, when the gasket is tightened, the tightening pressure is equally spread over the solid portion. Therefore, deformation of a cylinder block is reduced.

On the other hand, the sealing device may be formed to have a space between the upper and lower inner sections near the curved portion. When the gasket is tightened, the curved portion is compressed to provide a surface pressure for sealing around the hole of the engine.

DETAILED DESCRIPTION OF PREFERRED EMBODIMENTS

Figure 1:
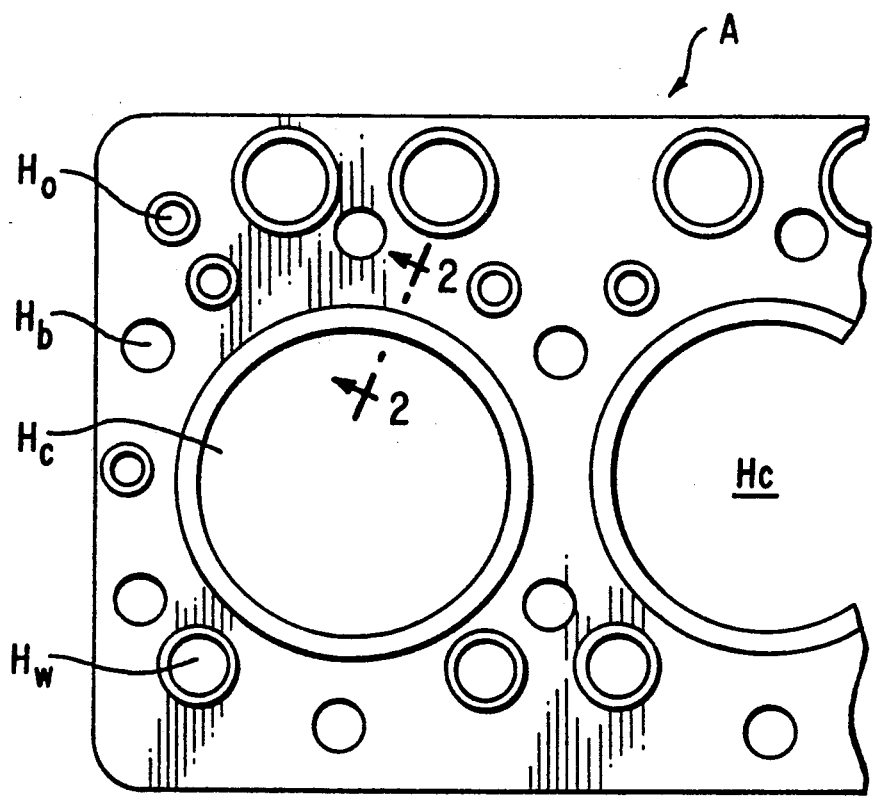
FIG. 1 is a plan view of a part of a first embodiment of a gasket of the invention.
Figure 2:
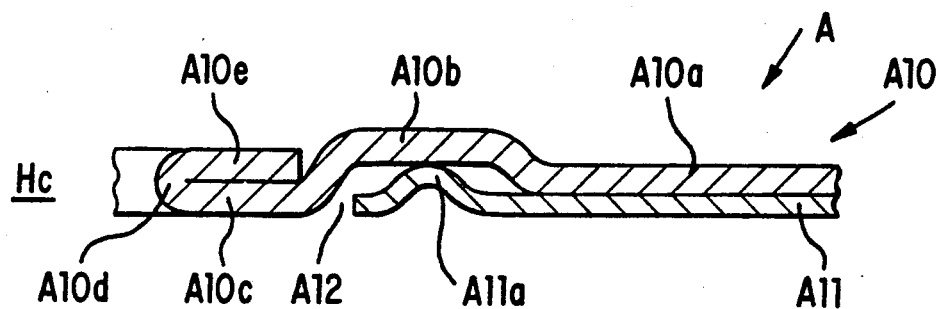
FIG. 2 is an enlarged section view taken along line 2—2 in FIG. 1.

Referring to FIGS. 1 and 2, a first embodiment A of a steel laminate gasket of the invention is shown. The gasket A is a cylinder head gasket, and includes cylinder bores Hc, water holes Hw, oil holes Ho and bolt holes Hb, as in the conventional gasket.

The sealing mechanism of the invention is applied around the cylinder bore Hc, but the same sealing mechanisms may be formed around other holes, or for other gaskets, such as a manifold gasket.

As shown in FIG. 2, the gasket A comprises an upper plate A10, and a lower plate A11 situated under the upper plate A10. The upper plate A10 includes a base section A10a extending substantially throughout the entire area of the gasket A, and a wide bead A10b with a flat top portion around the cylinder bore Hc. A lower inner portion A10c of the upper plate A10 extends further inwardly from the bead A10b, and an upper inner portion A10e is turned at a curved portion A10d and is situated above the lower inner portion A10c.

The cylinder bore Hc is defined by the curved portion A10d. Also, the upper and lower inner portions A10c, A10e constitute a solid portion around the cylinder bore Hc.

The height of the bead A10b, i.e. the distance from the lower surface of the lower inner portion A10c to the upper surface of the bead A10b, is higher than the thickness of the solid portion, i.e. the distance from the lower surface of the lower inner portion A10c to the upper surface of the upper inner portion A10e.

The lower plate A11 is situated under the base section A10a of the upper plate A10 and extends substantially throughout the entire area of the gasket A. The lower plate A11 includes a hole A12, and a support bead A11a around the hole A12. The size of the hole A12 is larger than the size of the lower inner portion A10c. Therefore, the lower plate A11 does not pile over the lower inner portion A10c.

When the upper and lower plates A10, A11 are assembled, the support bead A11a is located under the wide bead A10b. The bead A11a supports the bead A10b when the gasket A is compressed.

The thickness of the lower plate A11 is made thinner than the thickness of the upper plate A10. Namely, the thickness of the solid portion is thicker than the total thickness of the plates outside the solid portion. Therefore, the solid portion or the upper and lower inner portions A10e, A10c prevents that the beads A10b, A11a are completely compressed.

In the present invention, when the gasket A is tightened between a cylinder head and a cylinder block (both not shown), the beads A10b, A11a are compressed, but the upper and lower inner portions A10e, A10c form the solid portion and are not resiliently compressed.

Therefore, the solid portion incompressibly seals around the cylinder bore Hc, while the beads A10b, A11a resiliently seal around the cylinder bore Hc. Since the solid portion is formed around the cylinder bore Hc, when the gasket A is tightened, tightening pressure is not concentrated at one portion and is equally spread on the solid portion. Therefore, the gasket can be tightened at high tightening pressure without substantial deformation of the cylinder bore Hc.

As explained before, the lower plate A11 is thinner than the upper plate A10. Therefore, the solid portion, i.e. the upper and lower inner portions A10e, A10c, is thicker than the total thickness of the upper and lower plates A10, A11 outside the solid portion. When the gasket A is tightened, therefore, the beads A10b, A11a are not completely compressed. As a result, creep relaxation of the beads A10b, A11a is prevented by the solid portion.

When the gasket A is assembled, the support bead A11a is situated under the wide bead A10b. Therefore, when the bead A10b is compressed, the bead A10b is supported by the bead A11a. In this respect, if there is no support bead, since the bead A10b is wide, the center portion of the bead A10b generally dents or collapses first when the bead A10b is compressed. However, since the bead A11a supports the bead A10b, the bead A10b does not partly dents and is substantially equally compressed. As a result, wide, strong and equal surface pressure is obtained by the beads A10b, A11a.

The gasket is sealed widely and incompressibly by the solid portion and widely, strongly and resiliently by the beads A10b, A11a. The area around the cylinder hole is securely sealed.

Figure 3:
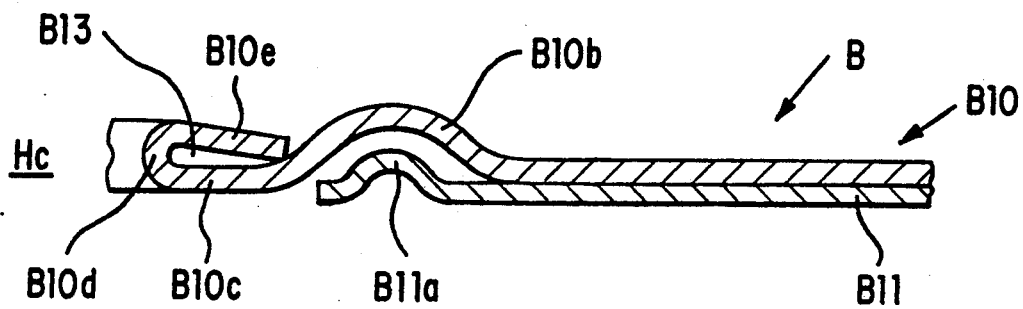
FIG. 3 is a section view, similar to FIG. 2, of a second embodiment of the invention.

FIG. 3 shows a second embodiment B of a steel laminate gasket of the invention. The gasket B comprises an upper plate B10 with a bead B10b, and a lower plate B11 with a bead B11a, similar to the gasket A. In the gasket B, however, the bead B10b of the upper plate B10 is curved gently instead of the bead A10b with the flat top portion. Further, an upper inner portion B10e is bent over a lower inner portion B10c at a curved portion B10d to have a space B13.

In the gasket B, since the bead B10b is curved gently, when the gasket B is tightened, the bead B10b of itself can provide a strong counter force or surface pressure more than the bead A10b while the bead B10b is supported by the bead B11a. Also, since the space B13 is formed near the curved portion B10d, when the gasket B is tightened, the curved portion B10d is compressed. Therefore, the curved portion B10d can also provide a surface pressure when the gasket is tightened. The upper and lower inner portions B10e, B10c also operate as a solid portion, though the curved portion B10d slightly provides resiliency.

Accordingly, in the gasket B, the curved portion B10d and the beads B10b, B11a provide counter force or surface pressure around the cylinder bore Hc when the gasket is tightened. The gasket B can securely seal around the cylinder bore Hc.

In the present invention, the gasket is provided with a plurality of sealing portions around a hole to be sealed, which are spaced apart from each other. One of the sealing portions has a wide sealing area.

In particular, the gasket can be tightened strongly without deformation of the hole to be sealed by the solid portion. The gasket can also provide wide and strong surface pressure outside the solid portion by the wide bead and the support bead. Therefore, the area around the hole can be securely sealed.

While the invention has been explained with reference to the specific embodiments of the invention, the explanation is illustrative and the present invention is limited only by the appended claims.

What is claimed is:

1. A steel laminate gasket for an internal combustion engine having at least one hole therein comprising:
a first metal plate including at least one first hole corresponding to the hole of the engine, a sealing device situated around the first hole to define and seal around the same, said sealing device including a lower section, an upper section terminating in an edge of said first metal plate and being situated above the lower section and a curved portion situated between the upper and lower sections and defining the first hole, a base section extending substantially throughout an entire area of the gasket, and a wide bead situated between the sealing device and the base section, said wide bead, when the gasket is tightened, being compressed to widely seal around the first hole outside the sealing device, and a second metal plate situated under the base section of the first plate, said second plate having at least one second hole, the diameter of the second hole being larger than the diameter of the sealing device to permit the second plate to laminate the base section without laminating the sealing device when the gasket is assembled, and a support bead situated around the second hole to be located under the wide bead, said support bead, when the gasket is tightened, supporting the wide bead to widely and securely seal around the hole of the engine.

2. A steel laminate gasket according to claim 1, wherein said wide bead has a width greater than a height thereof.

3. A metal laminate gasket for an internal combustion engine having at least one hole therein consisting essentially of:

a first metal plate including at least one first hole corresponding to the hole of the engine, a sealing device situated around the first hole to define and seal around the same, said sealing device including a lower section, an upper section terminating in an edge of said first metal plate and being situated above the lower section and a curved portion situated between the upper and lower sections and defining the first hole, a base section extending substantially throughout an entire area of the gasket, and a wide bead situated between the sealing device and the base section and extending outwardly beyond the sealing device and the base section, said wide bead, when the gasket is tightened, being compressed to widely seal around the first hole outside the sealing device, and a second metal plate situated under the base section of the first plate, said second plate having at least one second hole, the diameter of the second hole being larger than the diameter of the sealing device to permit the second plate to laminate the base section without laminating the sealing device when the gasket is assembled, and a support bead situated around the second hole to be located under the wide bead so that when the gasket is tightened, the sealing device formed of the upper and lower sections provides resiliency less than a predetermined value, and the wide bead with the support bead provides wide and high resiliency grater than that formed at the sealing device around the first hole to widely and securely seal around the hole of the engine by the different resiliency.

4. A steel laminate gasket for an internal combustion engine having at least one hole therein comprising:

a first metal plate including at least one first hole corresponding to the hole of the engine, a sealing device situated around the first hole to define and seal around the same, said sealing device including a lower section, an upper section terminating in an edge of said first metal plate and being situated above the lower section and a curved portion situated between the upper and lower sections and defining the first hole, a base section extending substantially throughout an entire area of the gasket, and a wide bead situated between the sealing device and the base section, said wide bead having a width greater than a height thereof and, when the gasket is tightened, being compressed to widely seal around the first hole outside the sealing device, and a second metal plate situated under the base section of the first plate, said second plate having at least one second hole, the diameter of the second hole being larger than the diameter of the sealing device to permit the second plate to laminate the base section without laminating the sealing device when the gasket is assembled, and a support bead situated around the second hole to be located under the wide bead, said support bead, when the gasket is tightened, supporting the wide bead to widely and securely seal around the hole of the engine, a thickness of the first plate being thicker than that of the second plate so that the sealing device is thicker than the total thickness of the gasket outside thereof when the gasket is tightened to prevent creep relaxation of the wide bead and the support bead.

5. A steel laminate gasket according to claim 4, wherein said upper section entirely abuts against the lower section to form a solid portion thereat.

6. A steel laminate gasket according to claim 5, wherein said wide bead includes a flat top portion, said support bead abutting against the flat top portion when the gasket is assembled.

7. A steel laminate gasket according to claim 4, wherein said sealing device includes a space between the upper and lower sections near the curved portion, said curved portion, when the gasket is tightened, being compressed to provide a surface pressure for sealing around the hole of the engine.

8. A steel laminate gasket according to claim 7, wherein said wide bead of the first metal plate is greater in curvature than that of the support bead, said support bead, when the gasket is compressed, abutting against the wide bead and supporting the same.

* * * * *